United States Patent [19]

Bedell et al.

[11] Patent Number: 5,280,082

[45] Date of Patent: Jan. 18, 1994

[54] SULPHONATION PROCESS FOR LOW CROSSLINKED POLYSTYRENE

[75] Inventors: Stanley F. Bedell, Andover; Speros P. Nemphos, Clinton, both of Mass.

[73] Assignee: Camelot Technologies, Inc., Leominster, Mass.

[21] Appl. No.: 37,662

[22] Filed: Mar. 24, 1993

Related U.S. Application Data

[63] Continuation of Ser. No. 877,380, Apr. 29, 1992, abandoned, which is a continuation of Ser. No. 647,981, Jan. 30, 1991, abandoned.

[51] Int. Cl.$^5$ .............................................. C08F 8/36
[52] U.S. Cl. .................................. 525/344; 525/242; 525/332.2
[58] Field of Search .......................................... 525/344

[56] References Cited

U.S. PATENT DOCUMENTS

| | | |
|---|---|---|
| 3,072,618 | 1/1963 | Turbak ............................. 525/344 |
| 3,128,257 | 4/1964 | Hoover . |
| 3,133,030 | 5/1964 | Wheaton . |
| 3,158,583 | 11/1964 | Corte . |
| 3,205,285 | 9/1965 | Turbak ............................. 525/344 |
| 3,870,841 | 3/1975 | Makowski . |
| 4,209,592 | 6/1980 | Akiyama et al. ................... 521/33 |
| 4,448,935 | 5/1984 | Iovine et al. ..................... 525/343 |

FOREIGN PATENT DOCUMENTS 860636 3/1986 Greece .

*Primary Examiner*—Christopher Henderson
*Attorney, Agent, or Firm*—Stevens, Davis, Miller & Mosher

[57] ABSTRACT

Crosslinked styrenic polymers may be sulphonated in a controlled manner in an organic solvent at elevated temperature using SO$_3$ in the presence of a trialkyl phosphate. The process does not introduce further crosslinking into the polymer permitting it to have an extremely high water uptake. The resulting polymer is useful as a hydrogel.

12 Claims, No Drawings

SULPHONATION PROCESS FOR LOW CROSSLINKED POLYSTYRENE

This application is a continuation of U.S. patent application Ser. No. 07/877,380, filed Apr. 29, 1992 now abandoned, which is a continuation of U.S. patent application Ser. No. 07/647,981, filed Jan. 30, 1991 now abandoned.

FIELD OF THE INVENTION

The present invention relates to the sulphonation of polymers. More particularly it relates to the sulphonation of crosslinked vinyl polymers.

BACKGROUND OF THE INVENTION

Sulphonated polymers have been known for some time. Non-crosslinked sulphonated vinyl polymers have been known since at least the early nineteen sixties.

U.S. Pat. No. 3,072,618 issued Jan. 8, 1963 in the name of Albin F. Turback, assigned to Esso Research and Engineering, discloses a process for the sulphonation of non-crosslinked polystyrene. In fact the disclosure of the patent makes it clear that it is important to reduce the number of crosslinks to the smallest possible number (Col. 1, line 31). The object of U.S. Pat. No. 3,072,618 was to prepare water soluble polymers which would be useful as thickeners, impregnants, adhesives, soil conditioners and textile sizes.

Greek Patent 86.0636 in the names of G. Valkanas and P. Rigas issued Mar. 18, 1986 discloses that polystyrene crosslinked by reaction with a di-alkylhalo aromatic compound in the presence of a Lewis Acid is useful in agricultural applications after it has been sulphonated. The Greek Patent discloses a process for sulphonation in which a gel of the crosslinked polystyrene is sulphonated with sulfuric acid. From a practical point of view such a process results in a significant amount of acid water which must be separated and treated before safe disposal. This is a disadvantage which needs to be overcome before the technology disclosed in the Greek Patent can be effectively commercialized.

The polymers disclosed in the Greek Patent are not water soluble as they are intended to stay in the ground to hold water in the soil. The polymers disclosed in U.S. Pat. No. 3,072,618 are intended to be water soluble. Interestingly applicants have discovered that the process designed for use with non-crosslinked polymers is also useful with crosslinked starting materials in accordance with the present invention.

U.S. Pat. No. 4,209,592 issued Jun. 24, 1980, assigned to Rohm and Haas Company discloses a process to manufacture ion exchange resin. In the process $SO_3$ is used both as a crosslinking agent and as a sulphonating agent. Uncrosslinked polystyrene is reacted directly with $SO_3$ in an halogenated solvent. While the resulting polymer is a sulphonated crosslinked vinyl aromatic monomer it does not have the same water uptake as the polymers of the present invention. Particularly, the sulphonated croslinked vinyl aromatic polymers of the present should have a water up take of at least 15000, preferably 20000, most preferably 25000 or greater weight % of water. It is clear from the examples of U.S. Patent the water uptake is below about 100 weight %.

U.S. Pat. No. 4,448,935 issued May 15, 1984, assigned to National Starch and Chemical discloses a process for simultaneously crosslinking and sulphonating polystyrene. The patent contains a limitation that the process is conducted a low temperatures from 0° to 25° C. The process of the present invention operates a higher temperatures than those disclosed in the reference. The process of the present invention provides a controlled sulphonation process which may be carried out at elevated temperatures. Most importantly the process does not introduce a significant further amount of crosslinking into the crosslinked polymer.

SUMMARY OF THE INVENTION

Accordingly the present invention provides a process to produce a sulphonated crosslinked vinyl aromatic polymer having a water up take of not less than 150 times its weight (e.g. 15000 weight %) comprising:

(a) swelling a crosslinked vinyl aromatic polymer in an organic solvent at temperature and pressure conditions so that said organic solvent remains a liquid;

(b) optionally separating the swollen insoluble crosslinked vinyl aromatic polymer from said organic solvent;

(c) contacting for a period of time from ten minutes to five hours at a temperature greater than 30° C. said swollen crosslinked vinyl aromatic polymer in said organic solvent with a mixture comprising a trialkyl phosphate and sulfur trioxide in a molar ratio from 1:1 to 1:4 the weight ratio of said sulfur trioxide to said crosslinked polymer being from 1:3 to 1:0.5; and (d) separating the resulting sulphonated crosslinked vinyl aromatic polymer from the solution of organic solvent and mixture of said trialkyl phosphate and sulfur trioxide.

DETAILED DESCRIPTION

Vinyl polymers useful in accordance with the present invention typically contain aromatic rings. Preferred polymers are styrenic in nature. The polymers may be prepared in accordance with the teachings of the Greek Patent 86.0636 by dissolving polystyrene in a polar organic solvent then reacting the resulting solution with a dialkylhalo aromatic compound in the presence of a Lewis Acid such as $SbCl_5$, $FeCl_3$ and $ZnCl_2$, preferably, $SbCl_5$. The details of the process are disclosed in the literature. e.g. "Crosslinking of Polystyrene by Mono- and Difunctional Agents", Nikolaos A. Peppas and George N. Valkanas, Makromolekulare Chemie 62 (1977) 163; and "Friedal - Crafts Crosslinking of Polystyrene" N. Grassie and J. Gilks, Journal of Polymer Science: Polymer Chemistry Edition, Vol. 11, 1531-1552.

Polymers produced by such a process may be characterized as comprising polymers of $C_{8-12}$ vinyl aromatic monomers and optionally minor amounts of non-aromatic copolymerizable vinyl monomers well known to those skilled in the art of styrenic copolymer technology which have been crosslinked with a dialkylhalo aromatic compound in the presence of a lewis acid. Typically the aromatic compound is a benzene compound. The alkyl groups are generally $C_{1-4}$ alkyl radicals which are halogenated. Preferably the halogen atom is a chlorine atom. The aromatic compound may be further substituted by up to two $C_{1-4}$ alkyl radicals. Useful dialkyl halo aromatic compounds include 1, 4-dichloromethyl benzene and 2, 5-dimethyl-1, 4-dichloromethyl benzene. (also referred to as 2, 5 bis(-chloromethyl)-p-xylene).

It is also possible to produce crosslinked vinyl aromatic polymers by the direct polymerization of a monomer mixture comprising essentially one or more monovinyl aromatic monomers and one or more poly- or di-vinyl aromatic monomers. The system which is most well known is the production of crosslinked polystyrene by polymerizing styrene and a small amount of divinyl benzene or its analogues such as diisopropenyl benzene etc., or other crosslinking agents such as ethylene glycol dimethacrylate (EGDM) or PEGDM etc. Typically the ratio of styrene to divinyl benzene will be from 97:3 to 99.95:0.05 preferably from 98:2 to 99.95:0.05, most preferably from 99:1 to 99.95:0.05.

Such polymers might be characterized as copolymers comprising from 95 to 99.9 most preferably from 98 to 99 weight % of one or more $C_{8-12}$ vinyl aromatic monomers which are unsubstituted or substituted by a $C_{1-4}$ alkyl radical or a chlorine atom and from 5, most preferably from 2 to 0.05 weight % of a divinyl aromatic monomer, or other known crosslinking agents.

It is pointed out in Greek Patent 86.0636 that other aromatic containing polymers may be crosslinked using a Lewis Acid in the presence of a dialkylhalo aromatic reactant Suitable other polymers may include:
 (a) copolymers comprising from 10 to 40 weight % of a copolymer comprising 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{3-8}$ vinyl nitriles which have been grafted onto from 90 to 60 weight % of a homopolymer of one or more $C_{4-6}$ conjugated diolefins; and
 (b) copolymers comprising from 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{4-6}$ conjugated diolefins.

In addition to the polymers disclosed in the Greek Patent the following polymers may also be used in accordance with the present invention:
 (a) copolymers comprising from 90 to 60 weight % of one or more $C_{8-12}$ vinyl aromatic monomers which are unsubstituted or substituted by a $C_{1-4}$ alkyl radical or a chlorine atom, from 10 to 40 weight % of one or more $C_{1-4}$ alkyl acrylates or methacrylates, and from 0 to 10 weight % of one or more $C_{3-6}$ ethylenically unsaturated carboxylic acids and anhydrides of $C_{4-8}$ ethylenically unsaturated carboxylic acids; and
 (b) graft copolymers comprising from 90 to 60 weight % of a copolymers comprising from 90 to 60 weight % of one or more $C_{8-12}$ vinyl aromatic monomers which are unsubstituted or substituted by a $C_{1-4}$ alkyl radical or a chlorine atom, from 10 to 40 weight % of one or more $C_{1-4}$ alkyl acrylates or methacrylates, and from 0 to 10 weight % of one or more $C_{3-6}$ ethylenically unsaturated carboxylic acids and anhydrides of $C_{4-8}$ ethylenically unsaturated carboxylic acids grafted onto from 10 to 40 weight % of one or more polymers selected from the group consisting of homopolymers of $C_{4-6}$ conjugated diolefins and homo- and co-polymers of $C_{4-8}$ alkyl and hydroxy alkyl esters of $C_{3-6}$ ethylenically unsaturated carboxylic acids which esters form homopolymers having a tg of less than $-20°$ C.

Although the discussion of aromatic monomers has centered on styrene which is preferred, suitable vinyl aromatic monomers which are useful in accordance with the present invention include $C_{8-12}$ vinyl aromatic monomers which are unsubstituted or substituted by a $C_{1-4}$ alkyl radical or a chlorine atom. Such monomers include styrene, α-methyl styrene and chlorostyrene.

Suitable $C_{3-8}$ alkenyl nitriles include acrylonitrile and methacrylonitrile.

Suitable $C_{1-4}$ alkyl acrylates or methacrylates include methyl acrylate, ethyl acrylate, butyl acrylate, methyl methacrylate, ethyl methacrylate and butyl methacrylate.

Suitable polymers of $C_{4-6}$ conjugated diolefins include homopolymers of butadiene or copolymers of butadiene and isoprene. A particularly useful polymer of butadiene is the stereospecific polymer having at least 55 wt. % preferably more than 90 wt. % most preferably at least 95 wt. % of the polymer in the cis configuration. Thus a suitable polymer for use in accordance with the present invention is ABS.

The polymers useful in accordance with the present invention may be a copolymer of a vinyl aromatic monomer as discussed above with a conjugated diolefin as discussed above. One such polymer is styrene butadiene rubber.

The crosslinked polymer is one in which the crosslink density is such that the molecular weight of the polymer chain between crosslinks is from 10,000 to 50,0000, preferably from 15,000 to 45,000. The method for determining the molecular weight of the polymer chain between crosslinks is discussed in the paper Physical Characterization of Suspension Crosslinked Polystyrene Particles and Their Sulphonated Products: 1 Nonionic Networks, F. P. Regas and G. N. Valkanas; POLYMER, 1984, Vol 25, February 245, the text of which is hereby incorporated by reference.

In the process according to the present invention the polymer is first swollen in a organic solvent at temperature and pressure conditions such that the organic solvent remains a liquid at the temperature of treatment. Typically the temperature is from room temperature up to about 70° C. Preferred solvents are halogenated $C_{1-8}$ alkanes. Particularly useful solvents include dichloroethane, dichloromethane and 1,1,1-trichloroethane After the crosslinked polymer is swollen in the solvent the resulting swollen crosslinked vinyl aromatic polymer may optionally be separated from excess solvent. This treatment may be a simple procedure such as decanting the excess solvent or filtering the swollen crosslinked vinyl aromatic polymer from the solvent. However, other more sophisticated methods may be used to separate the swollen crosslinked vinyl aromatic polymer from the solvent such as centrifuging.

The resulting swollen crosslinked vinyl aromatic polymer is then treated with a mixture comprising a trialkyl phosphate and sulfur trioxide in a molar ratio from 1:1 to 1:4. Preferably the molar ratio of trialkyl phosphate to sulfur trioxide is from 1:2 to 1:3. The weight ratio of sulphur trioxide to crosslinked vinyl aromatic polymer to the mix is from 1:5 to 1:0.5 preferably about 1:1.

Suitable trialkyl phosphates include tri-$C_{1-4}$ alkyl phosphates. A particularly useful trialkyl phosphate is triethyl phosphate.

Sulfur trioxide is a liquid at temperatures up to about 45° C. and has a density of about 1.9. The sulfur trioxide may be used in the form of a solution dissolved in the organic solvent or an organic solvent soluble in or miscible with the organic solvent. The $SO_3$ may be used as 100% (pure SO$_3$) or obtained from an SO$_3$ generator or donor such as oleum. If oleum is used as a generator or donor it is mixed with the solvent and the excess sulfuric acid is separated from the oleum solvent mixture prior to the formation of the SO$_3$-trialkyl phosphate mixture or complex (e.g. the trialkyl phosphate is added to the solution after separation of the H$_2$SO$_4$). It is believed that the SO$_3$ and trialkyl phosphate form a complex.

The swollen crosslinked vinyl aromatic polymer is treated with the mixture or complex of trialkyl phosphate and sulfur trioxide for a period of time from ten minutes to about five hours, preferably from about thirty minutes to about two hours at a temperature from 30° C. to 65° C. preferably from about 30° C. up to 55° C. most preferably from 30° C. to 45° C. Typically the swollen crosslinked vinyl aromatic polymer is added to the trialkyl phosphate and SO$_3$ or a solution of the trialkyl phosphate and SO$_3$. As the polymer is sulphonated it precipitates from the reaction mixture.

After the sulphonation the crosslinked polymer may be separated from the solution of organic solvent and trialkyl phosphate/sulfur trioxide mixture by relatively simple means such as filtering. From a commercial point of view the solvent is recycled to minimize operating costs.

Normally the resulting sulphonated polymer is neutralized with a fixed alkali such as a hydroxide of a Group I or II metal, or an organic base such as ammonium hydroxide, ethanolamine, or other suitable organic bases in an alcololic medium generally comprising a C$_{1-4}$ alcohol. The salts resulting from the neutralization of the sulphonated crosslinked vinyl aromatic polymer may be removed from the polymer with the following treatment with a C$_{1-4}$ alkanol/water mixture. The process may comprise suspending and/or washing the neutralized sulphonated crosslinked polymer with a C$_{1-4}$ alkanol. The C$_{1-4}$ alkanol should be at least 50, preferably greater than 70 weight % as if too much water is present in the alkanol it will swell the polymer and cause problems with drying the sulphonated crosslinked vinyl aromatic polymer. Preferred alkanols include methanol, ethanol and propanol.

The resulting sulphonated crosslinked vinyl aromatic polymer may then be dried using conventional means and conditions. The dried polymer may be in granular form or as a fine powder.

In some specific applications the sulphonated crosslinked polymer may be washed and dried without prior neutralization as described above.

The present invention will be illustrated by the following nonlimiting examples in which unless otherwise specified parts are parts by weight.

EXAMPLE 1

Crosslinked polystyrene was prepared by dissolving 24 g of polystyrene in 125 g of dichloroethane containing 0.2 g of 1, 4-dimethyl-2, 5-dichloromethyl benzene. This solution was added to a mixture of 180 cc of silicone oil and 120cc of dichloroethane at 70° C. and 0.3 cc of antimony pentachloride catalyst was added to the resulting solution. The reactants were stirred and heated at 70° C. for 5 hours. After that time the reaction mass was cooled and a gel of polystyrene was separated from the silicone oil and dichloroethane. This resulted in approximately 125 g of gel.

125 g of gel produced as described above was swollen in 300 cc of dichloroethane. After an hour of swelling a solution consisting of 39 g of triethyl phosphate and 25 cc of sulfur trioxide (specific gravity about 1.97; molar ratio of 1:3) in 300 cc of dichloroethane was added to the swollen gel. The solutions were permitted to react at room temperature for one hour. At the end of this time the sulphonated polymer had precipitated from the dichloroethane in a non swollen state. The sulphonated polymer was suspended in methanol then neutralized with 50% aqueous KOH.

The resulting polymer was a sulphonated polystyrene hydrogel having a high water uptake. (300 g distilled water per g of polymer or 30000 weight %).

EXAMPLE 2

A 165 g of a copolymer of 99.8 wt. % of styrene and 0.2 wt. % of divinylbenzene was prepared by suspension polymerization using four incremental charges of styrene (35.2 g) and divinylbenzene (0.9 g) at twenty minute intervals from the exotherm of the initial charge of polymer. The reaction was initiated using a mixed initiator system comprising 4.2g of 70% perbenzoyl peroxide and 1.4 g of t-butyl perbenzoate. The polymerization took 5 hours and produced 165 g of beads of crosslinked polystyrene at 98% conversion.

The beads produced above were swollen in 2800 g of dichloroethane for two hours at 30° C. To the swollen beads was added a solution comprising 205 g of triethylphosphate and 132 ml of sulfur trioxide (molar ratio of 1:3) in about 2400 g of dichloroethane. The reaction mixture was stirred for one hour at room temperature. The precipitate resulting from the reaction was filtered and neutralized in 1.3 l of methanol and 200 cc of 50% KOH. The resulting salt is filtered and dried to yield 390 g of product. The salt may be further washed in a 70/30 methanol water mixture. The washed product has a water absorption of 350-400 g per g of polymer.

EXAMPLE 3

Crosslinked polystyrene was prepared by dissolving 46 g of polystyrene in 125 g of dichloroethane containing 0.12 g of 1, 4-dimethyl, 2, 5-dichloromethyl benzene. This solution was added to a mixture 180 cc of silicone oil and 120 cc dichloroethane at 70° C. and 1.8 cc 1 M antimony pentachloride in dichloromethane was added. The reactants were stirred and heated at 70° C. for 5 hours. After that time the reaction mass was cooled and a gel of polystyrene was separated from the silicone oil and dichloroethane. Approximately 190 g of gel was obtained.

85 g of gel produced as described above was swollen in 450 cc of dichloroethane. After an hour of selling a solution consisting of 24.6 g of triethyl phosphate and 16.5 cc of sulfur trioxide (SG 1.97; molar ratio 1:3) in 150 cc of dichloroethane was added to the swollen gel. The solutions were permitted to react for 10 minutes at room temperature. The temperature was raised to 35° C. and reaction allowed to proceed for 2 hours. At the end of this time the sulphonated polymer had precipitated from the dichloroethane in a non-swollen state. The sulphonated polymer was suspended in methanol then neutralized with 50% aqueous KOH. The resulting polymer was sulphonated polystyrene having a high water uptake. Completely purified polymer absorbs 800 g distilled water per g of polymer (e.g. 80000 weight % water uptake).

EXAMPLE 4

A styrene divinyl benzene copolymer containing 0.25% divinyl benzene was prepared according to the following recipe:

To an aqueous phase that consisted of a solution of 3 g vinyl 523 (polyvinyl alcohol) and 25 g NaCl in 2000 cc of $H_2O$ was added with agitation (300 RPM) 950 g styrene containing 0.5 g divinyl benzene (55%); 4 g 70% benzoyl peroxide and 2 g t-butylperbenzoate. The temperature was raised to 85° C. and after 30 minutes at this temperature 5 cc additions from a feed consisting of 50 g styrene and 4 g divinylbenzene (55%) were made every 30 minutes for the first 5 hours. Then every 45 minutes after 6 hours the temperature was raised to 115° C. and held there for 1 hour. A total of 14 additions were made. The reaction mixture was cooled. The beads separated and dried.

19.9 g of the above beads were allowed to swell for 2 hours in a solution of 13.2 g triethyl phosphate in 240 cc dichloromethane at 25° C. After 2 hours, a solution of 8.7 cc sulfur trioxide in 120 cc dichloromethane was added with rapid agitation over several minutes. The reaction was stirred at 25° C. for 3.5 hours. The sulphonated beads were separated from the solvent and suspended in 400 cc methanol and neutralized with 50% aqueous KOH. The salt was filtered and dried. A sample of the beads which were washed with water and dried had a water absorption in distilled water of 325 g per g polymer (e.g. 32500 weight % water uptake).

What is claimed is:

1. A process to produce a sulphonated crosslinked vinyl aromatic polymer selected from the group comprising copolymers consisting essentially of from 97 to 99.95 weight % of one or more $C_{8-12}$ vinyl aromatic monomers and from 3 to 0.05 weight % of a divinyl aromatic monomer, said sulphonated crosslinked polymer having a water up take of from 300 to 800 times its weight comprising:
   (a) swelling said crosslinked vinyl aromatic polymer in an organic solvent selected from the group consisting of dichloroethane, dichloromethane, and 1,1,1-trichloroethane at temperature and pressure conditions so that said organic solvent remains a liquid;
   (b) contacting for a period of time from ten minutes to five hours at a temperature from 30° C. to 45° C. said swollen crosslinked vinyl aromatic polymer in said organic solvent with a mixture comprising a tri $C_{1-4}$ alkyl phosphate and sulfur trioxide in a molar ratio from 1:1 to 1:4 the weight ratio of said sulfur trioxide to said crosslinked polymer being from 1:1 to 1:0.5; and
   (c) separating the resulting sulphonated crosslinked vinyl aromatic polymer from the solution of organic solvent and mixture of said trialkyl phosphate and said sulfur trioxide.

2. A process according to claim 1, further comprising separating the swollen insoluble crosslinked vinyl aromatic polymer from said organic solvent between step (a) and step (b).

3. A process according to claim 1, further comprising neutralizing said sulphonated vinyl aromatic polymer with a fixed alkali or an organic base.

4. A process according to claim 3, further comprising treating said neutralized sulphonated crosslinked vinyl aromatic polymer with a solution of at least 70 weight % of one or more $C_{1-4}$ alkanols.

5. A process according to claim 1, wherein said crosslinked vinyl aromatic polymer has a molecular weight of chains between crosslinks from 10,000 to 50,000.

6. A process according to claim 5, wherein said crosslinked vinyl aromatic polymer has a molecular weight of chains between crosslinks from 15,000 to 45,000.

7. A process according to claim 1, wherein the molar ratio of said tri $C_{1-4}$ phosphate to said sulfur trioxide is from 1:2 to 1:3.

8. A process according to claim 7, wherein said trialkyl phosphate is triethyl phosphate.

9. A process according to claim 8, wherein said crosslinked vinyl aromatic polymer is crosslinked polystyrene.

10. A process according to claim 9, further comprising neutralizing said sulphonated crosslinked vinyl aromatic polymer with a fixed alkali or an organic base.

11. A process according to claim 10, wherein said fixed alkali is selected from the group comprising Group I and Group II metal hydroxides.

12. A process according to claim 11, further comprising treating said separated sulphonated crosslinked vinyl polymer with a solution of at least 70 weight % of one or more $C_{1-4}$ alkanols.

* * * * *